United States Patent
Lehuede

(10) Patent No.: US 7,274,865 B2
(45) Date of Patent: Sep. 25, 2007

(54) GENERAL PURPOSE 100% SOLID STATE DRIVE FOR DIRECT CURRENT ROTARY MACHINES

(76) Inventor: Patricio Lagos Lehuede, Av. Los Pajaritos 6030, Estacion Central, Santiago (CL)

( * ) Notice: Subject to any disclaimer, the term of this patent is extended or adjusted under 35 U.S.C. 154(b) by 0 days.

(21) Appl. No.: 10/934,475

(22) Filed: Sep. 7, 2004

(65) Prior Publication Data

US 2005/0117893 A1 Jun. 2, 2005

Related U.S. Application Data

(60) Provisional application No. 60/502,970, filed on Sep. 16, 2003.

(51) Int. Cl.
*H02P 1/46* (2006.01)
(52) U.S. Cl. ............ 388/806; 388/803; 388/801; 388/809
(58) Field of Classification Search .......... 318/806, 318/798, 767, 246, 138, 439; 388/806, 803, 388/809, 801
See application file for complete search history.

(56) References Cited

U.S. PATENT DOCUMENTS

| | | | | |
|---|---|---|---|---|
| 3,569,809 A | * | 3/1971 | Comer .................. | 388/806 |
| 3,584,248 A | * | 6/1971 | Higashino et al. ...... | 310/68 R |
| 3,599,062 A | * | 8/1971 | Crane et al. .......... | 318/281 |
| 3,628,621 A | * | 12/1971 | Lee .................. | 180/65.8 |
| 3,701,494 A | * | 10/1972 | Proulx ................ | 242/331.3 |
| 3,818,299 A | * | 6/1974 | Paule et al. .......... | 388/808 |
| 3,820,000 A | * | 6/1974 | Smith ................ | 320/107 |
| 4,004,211 A | * | 1/1977 | Takao et al. .......... | 322/63 |
| 4,086,983 A | * | 5/1978 | Anzai et al. .......... | 187/297 |
| 4,267,492 A | * | 5/1981 | Manners .............. | 318/376 |
| 4,334,177 A | * | 6/1982 | Lund ................ | 388/806 |
| 4,639,647 A | * | 1/1987 | Posma ................ | 318/247 |
| 4,782,272 A | * | 11/1988 | Buckley et al. ........ | 318/254 |
| 5,055,751 A | * | 10/1991 | MacKelvie ............ | 318/254 |
| 5,359,154 A | * | 10/1994 | Tsukasa et al. ........ | 177/145 |
| 5,399,948 A | * | 3/1995 | Yang ................ | 318/245 |
| 5,408,166 A | * | 4/1995 | Yang ................ | 318/530 |
| 5,449,176 A | * | 9/1995 | Schwab, Jr. .......... | 473/268 |
| 5,574,341 A | * | 11/1996 | Yang ................ | 318/139 |
| 5,578,911 A | * | 11/1996 | Carter et al. .......... | 318/376 |
| 5,712,549 A | * | 1/1998 | Engel ................ | 318/376 |
| 5,717,303 A | * | 2/1998 | Engel ................ | 318/376 |
| 5,777,452 A | | 7/1998 | Thomas | |
| 5,875,281 A | * | 2/1999 | Thexton et al. ........ | 388/801 |
| 5,907,228 A | | 5/1999 | Thomas et al. | |

(Continued)

*Primary Examiner*—Rita Leykin
(74) *Attorney, Agent, or Firm*—Morris E. Cohen

(57) ABSTRACT

General purpose 100% solid state Direct Current drive for rotary DC machines with four quadrants operation. It is to say that allows the rotary DC machine to act like motor or generator in the two direction of possible rotation. In the first and third quadrant as motor in both direction of possible rotation, and in the second and fourth quadrant like regenerative brake DC generator, recovering the energy towards the DC network supply.

To obtain that generalized control for DC machines of any type, the invention subject of this patent, is based on the interaction of two original ideas that they are:
 (1) Maintaining the direction of the current in one and only one of the two main windings of the DC machine (7) either field or armature, by means of a rectifier bridge (6).
 (2) Use a DC controlled power supply (14), with reversible polarity to feed the complete machine.

21 Claims, 19 Drawing Sheets

*DC power supply with polarity exchange (4) applied to the armature (2) throught an internal rectifier (6) in series with the field winding (1.a) who maintain the current direction whatever the polarity be from (4) for controlling series excited DC machines (7).*

U.S. PATENT DOCUMENTS

| | | |
|---|---|---|
| 6,087,801 A | 7/2000 | Bethoux et al. |
| 6,198,248 B1 | 3/2001 | Thomas et al. |
| 6,313,603 B1 | 11/2001 | Poullain et al. |
| 6,414,408 B1 * | 7/2002 | Erdman et al. ........... 310/68 R |
| 6,479,957 B1 * | 11/2002 | Erdman et al. ............. 318/254 |
| 6,605,917 B2 | 8/2003 | Thomas et al. |
| 6,721,496 B2 * | 4/2004 | Smith ......................... 388/800 |

* cited by examiner

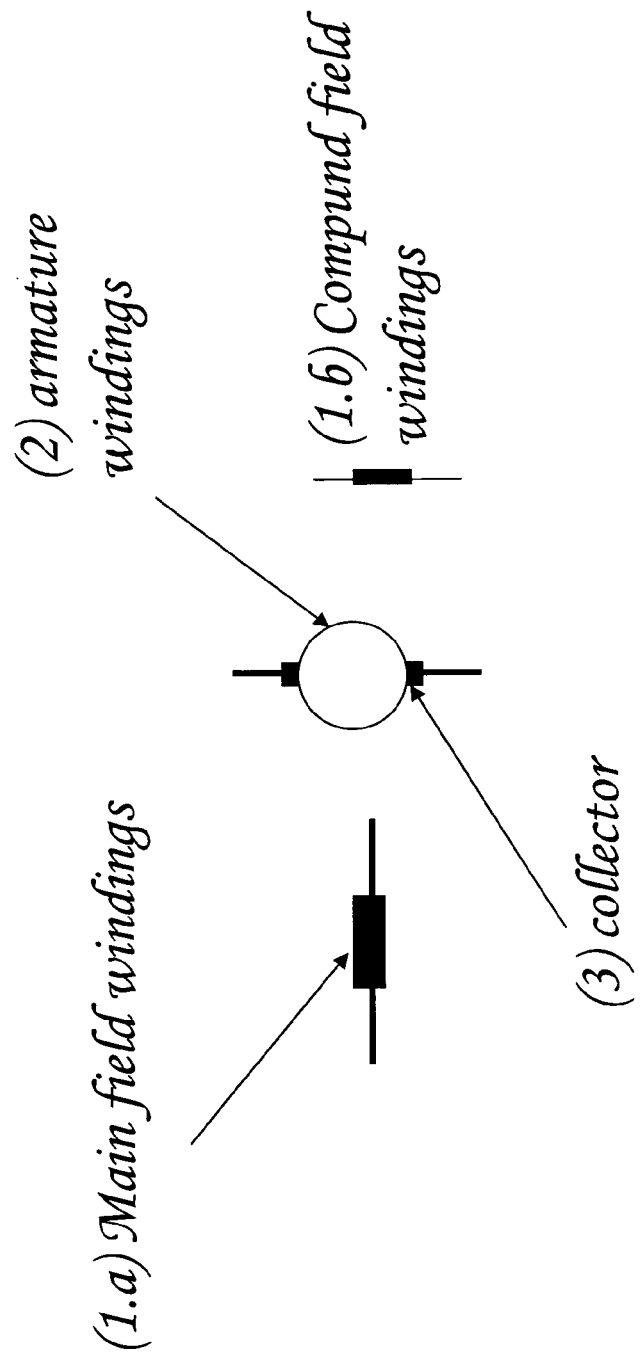
Figure A: Typical elementary component of a DC machine

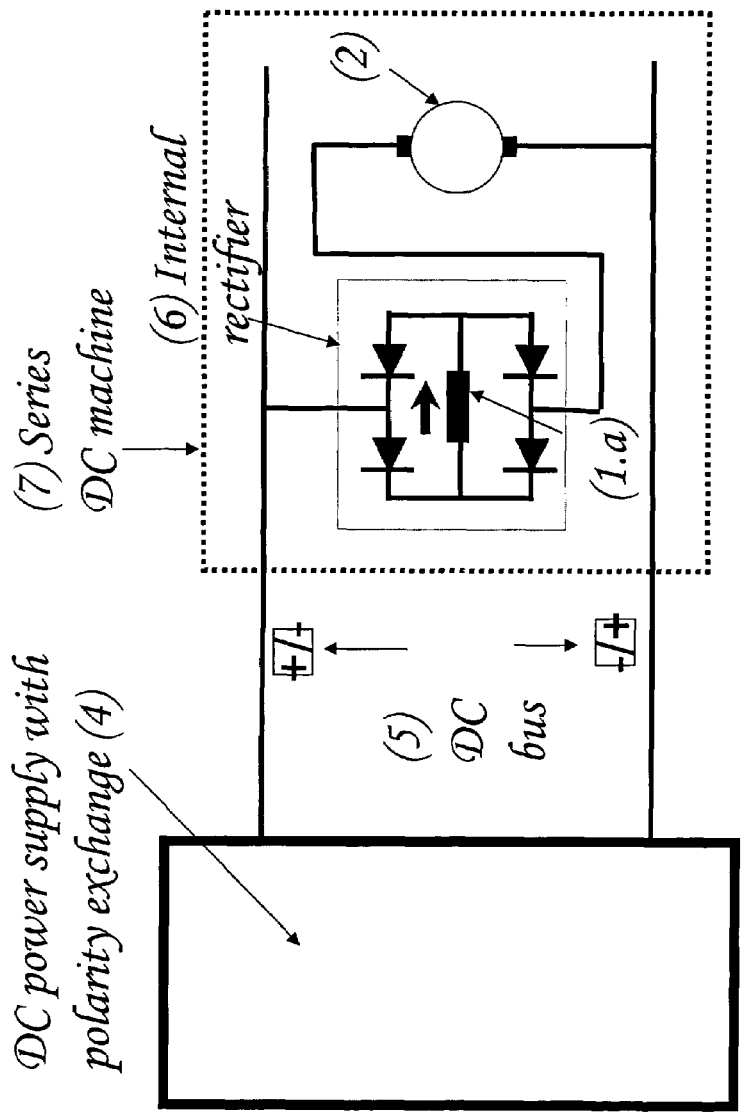
*Figure B:* *DC power supply with polarity exchange (4) applied to the armature (2) throught an internal rectifier (6) in series with the field winding (1.a) who maintain the current direction whatever the polarity be from (4) for controlling series excited DC machines (7).*

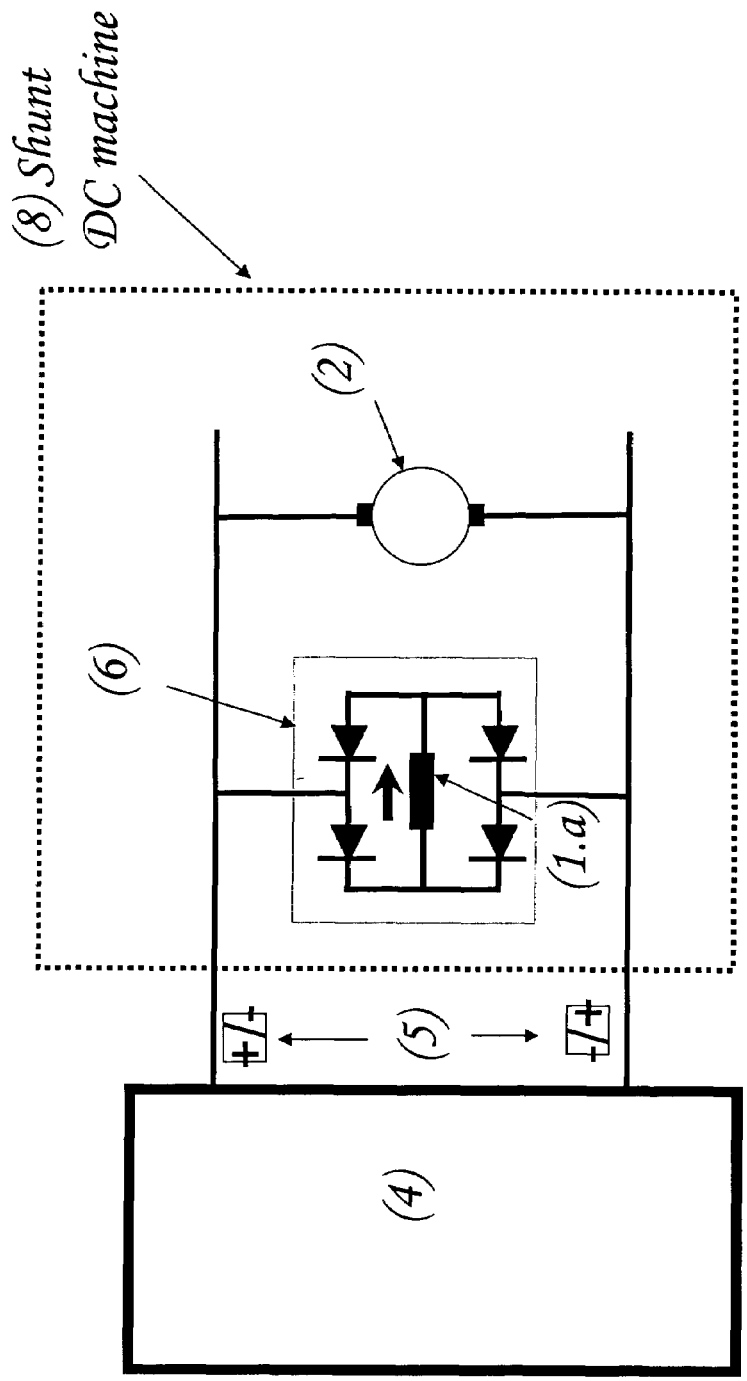
*Figure C: DC power supply with polarity exchange (4) applied directly to the armature (2) in parrallel with an internal rectifier (6) applied to the field windings (1.6) who maintain the current direction whatever the polarity be from (4) for controlling shunt DC machine (8).*

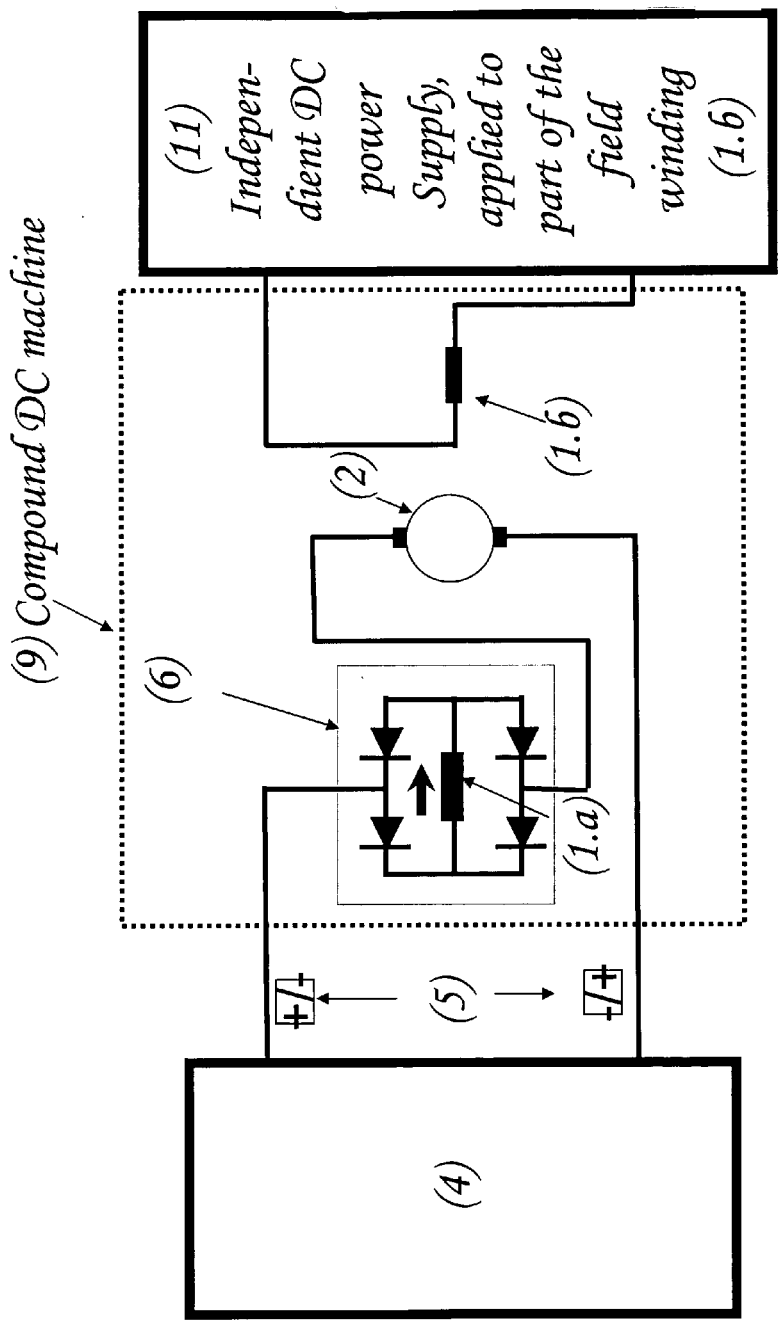
*Figure D:* *DC power supply with polarity exchange (4) applied to the armature (2) throught an internal rectifier (6) in series with the field winding (1.a) who maintain the current direction whatever the polarity be from (4) and an independent DC power supply (10) applied to part of the field windings (1.6) for controlling compound excited DC machines (9).*

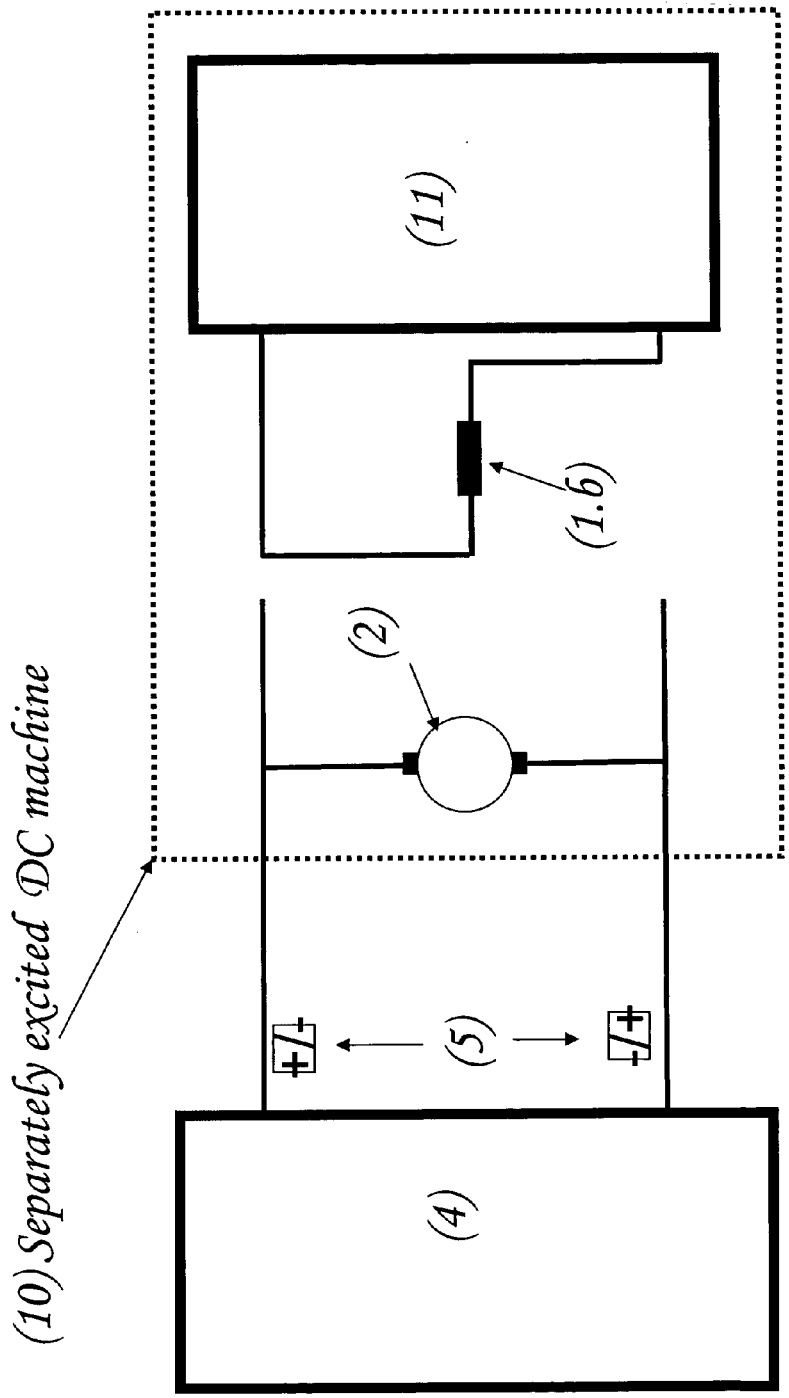
*Figure E: DC power supply with polarity exchange 4) without internal rectifier, for controlling separately excited DC machines (10) feed from an independent DC power supply (11).*

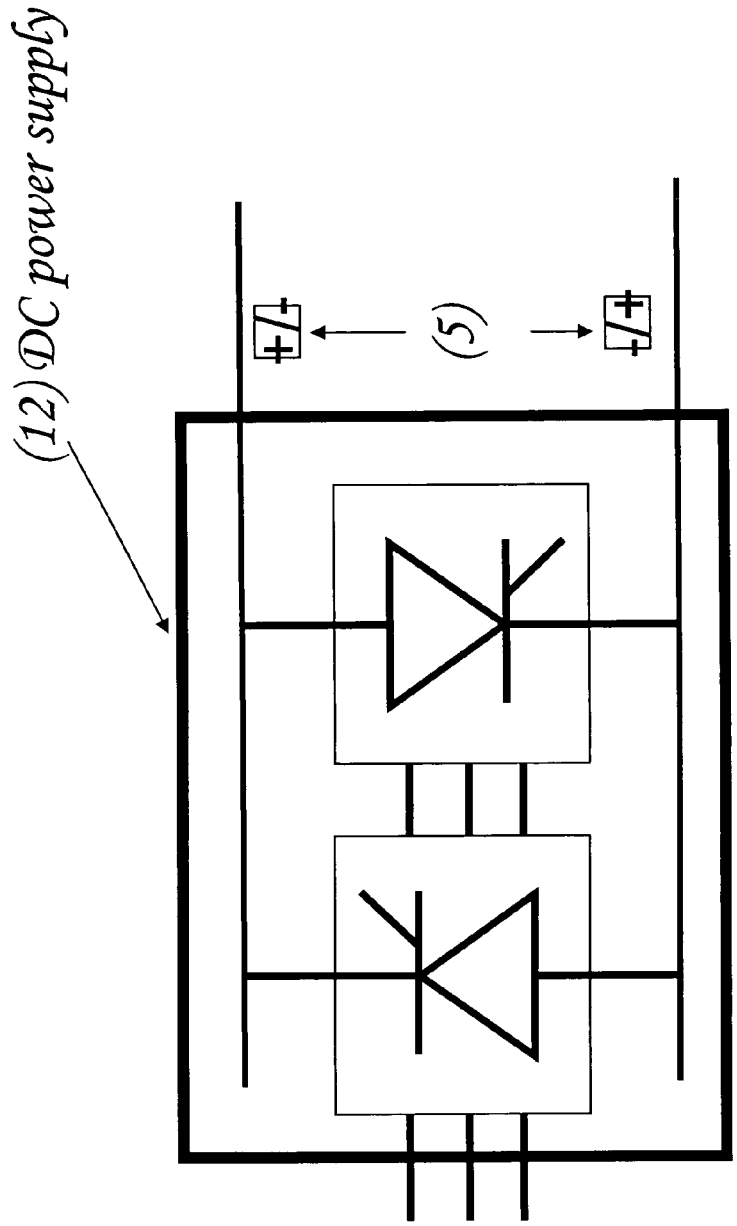
*Figure F: Direct current power supply (12) with polarity exchange feed from external AC power supply*

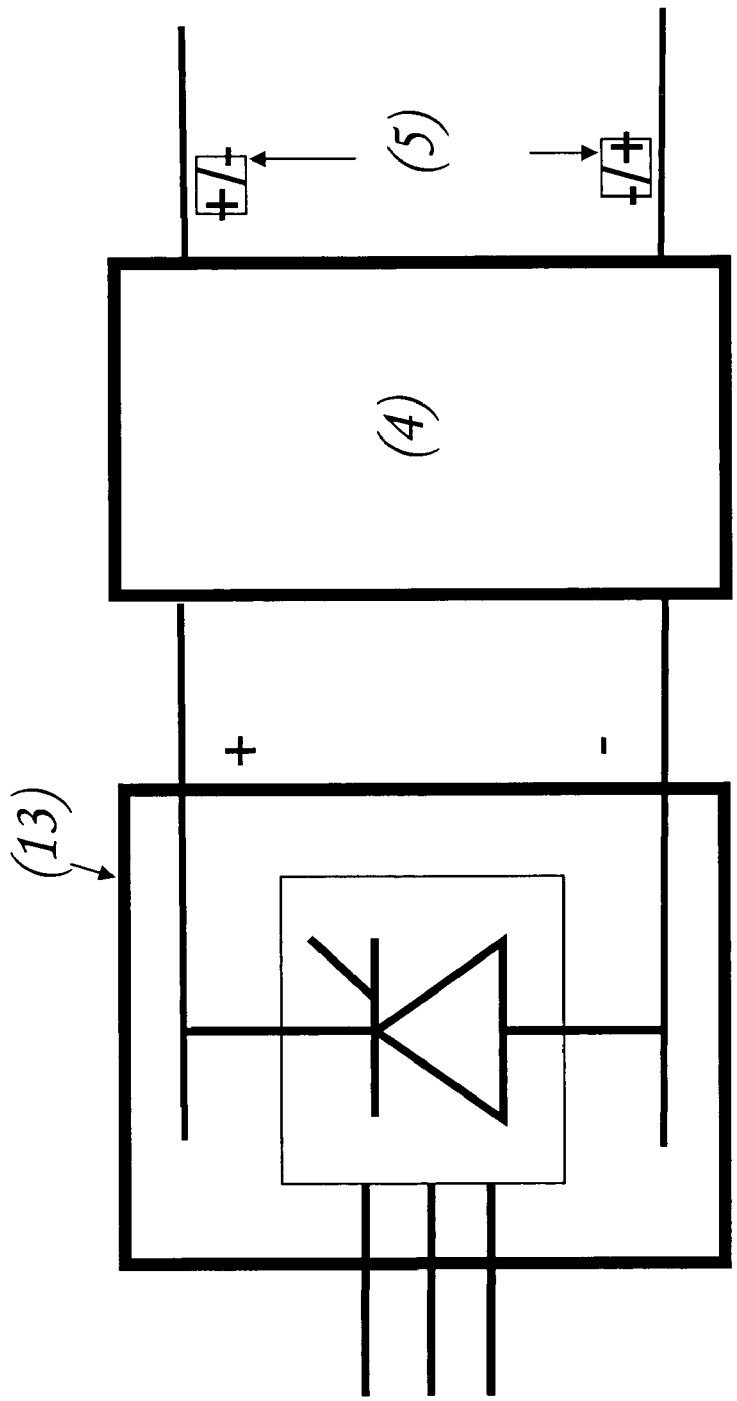
*Figure G: DC power supply with polarity exchange (4) connected to AC power supply using a rectifier controlled or not (13)*

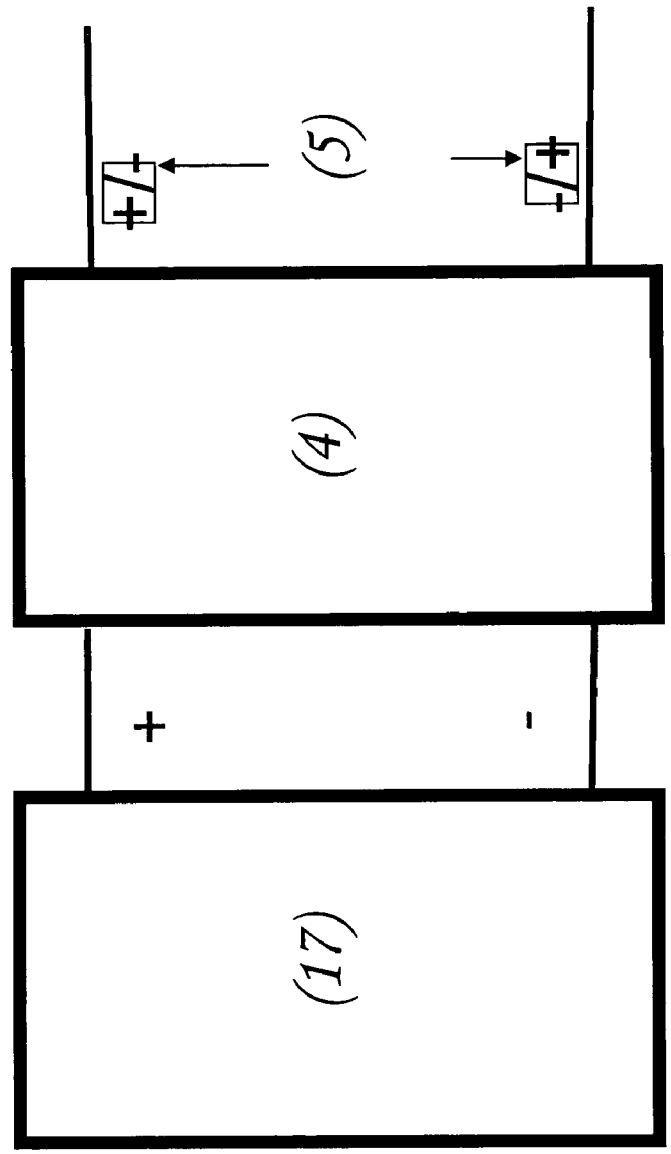
*Figure H: DC power supply with polarity exchange (4) connected to DC power supply, DC generator, Rectifier, battery, trolley, etc. (17).*

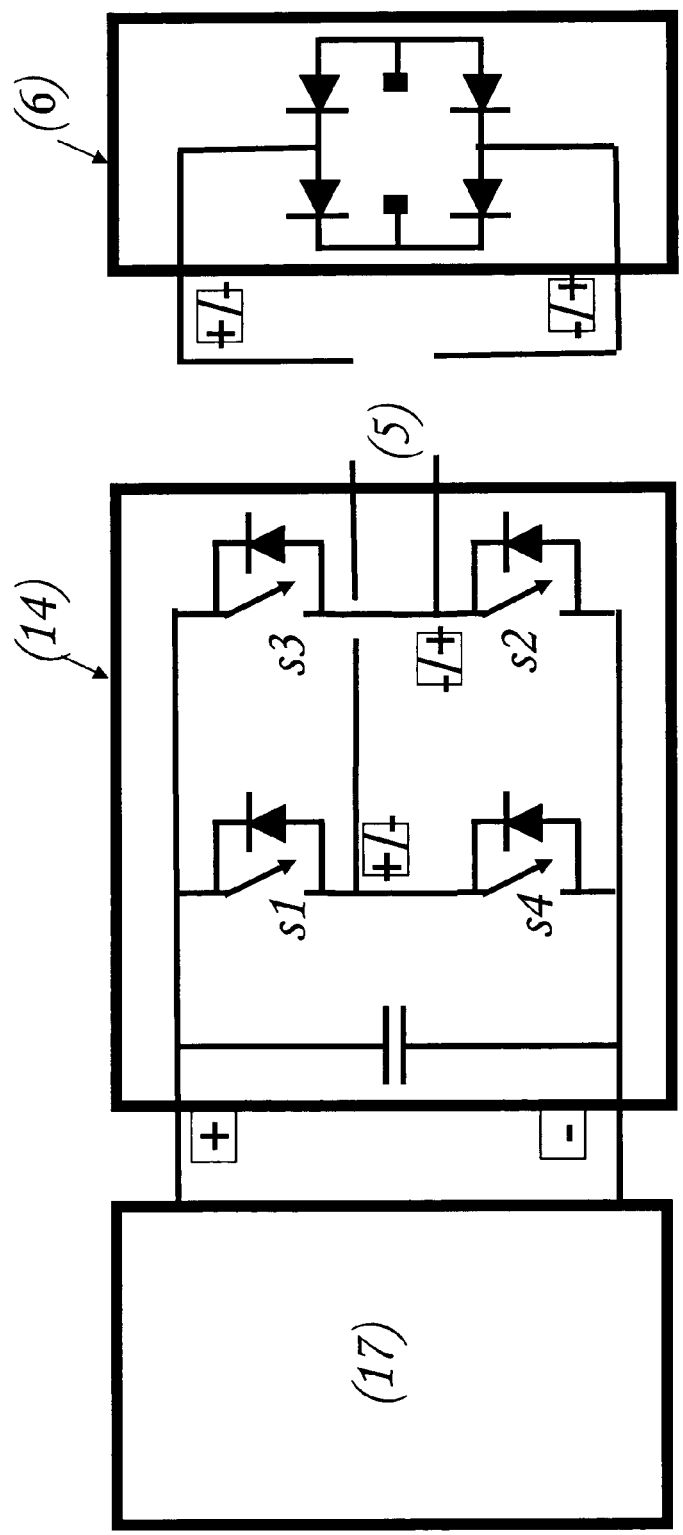
*Figure 1:* DC power supply with polarity exchange (4), like a voltage commutated converter (14), regenerative, connected to DC Power Supply and internal rectifier (6).

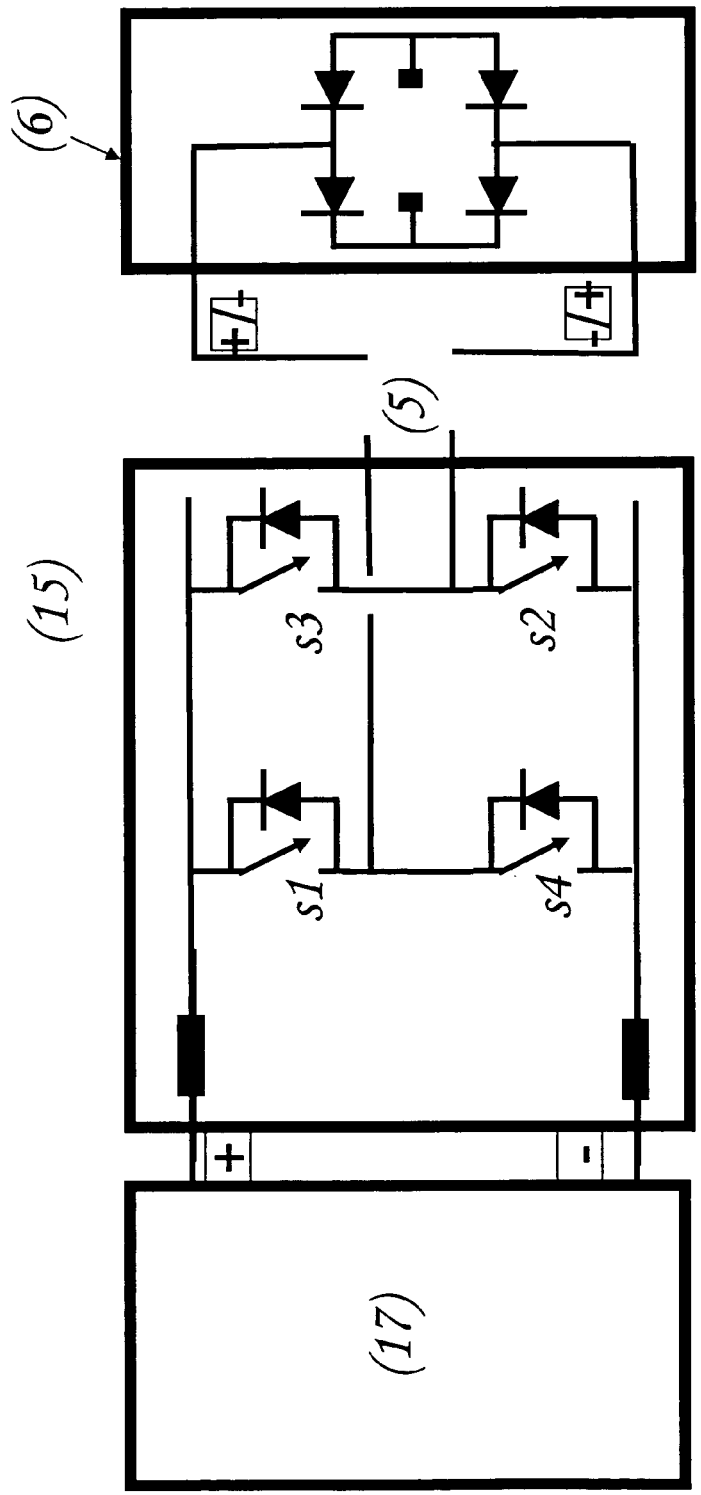
*Figure J:* DC power supply with polarity exchange (4), like a current commutated converter (15), regenerative, connected to DC Power Supply and internal rectifier (6).

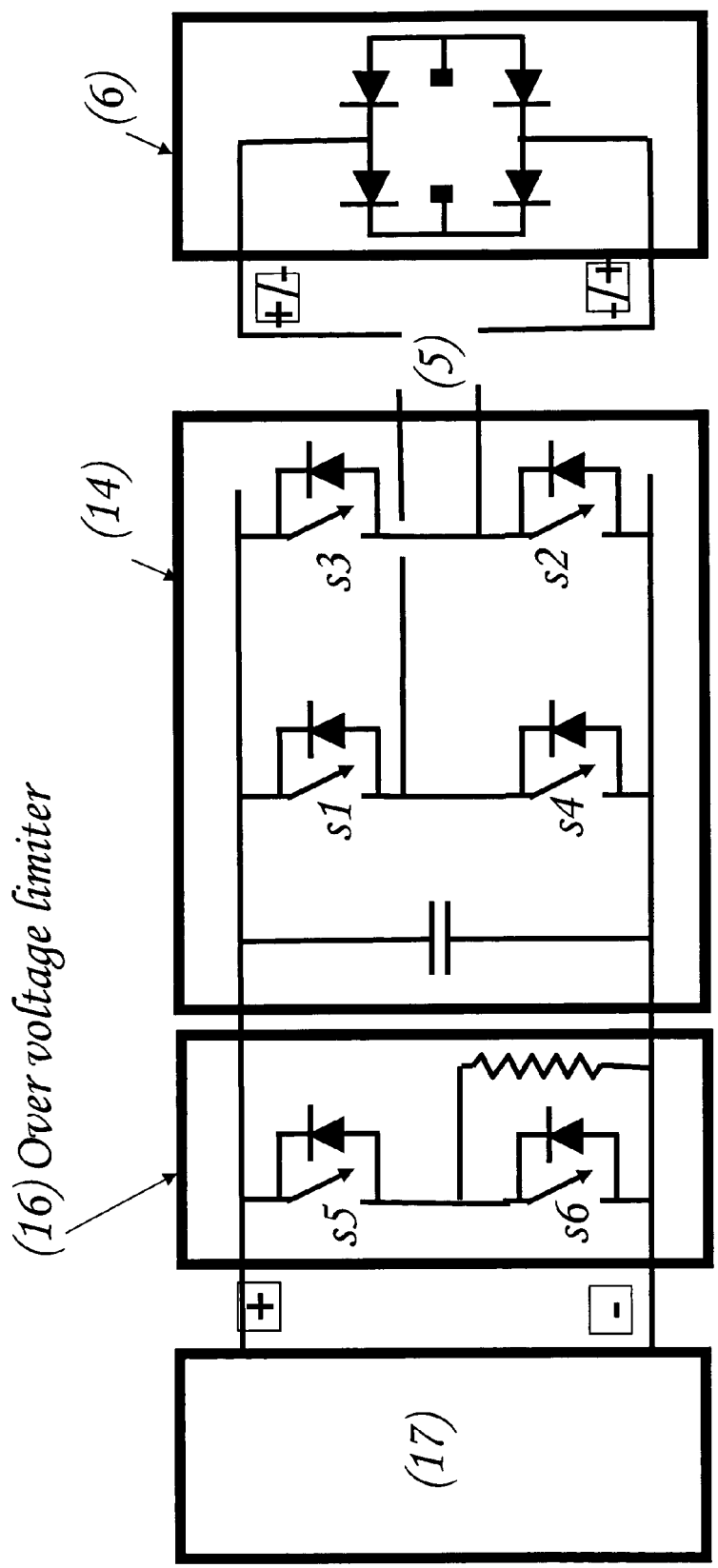
*Figure K:* *DC power supply with polarity exchange (4), like a voltage commutated converter (14), regenerative, connected to DC Power Supply and internal rectifier (6), with over voltage limiter (16).*

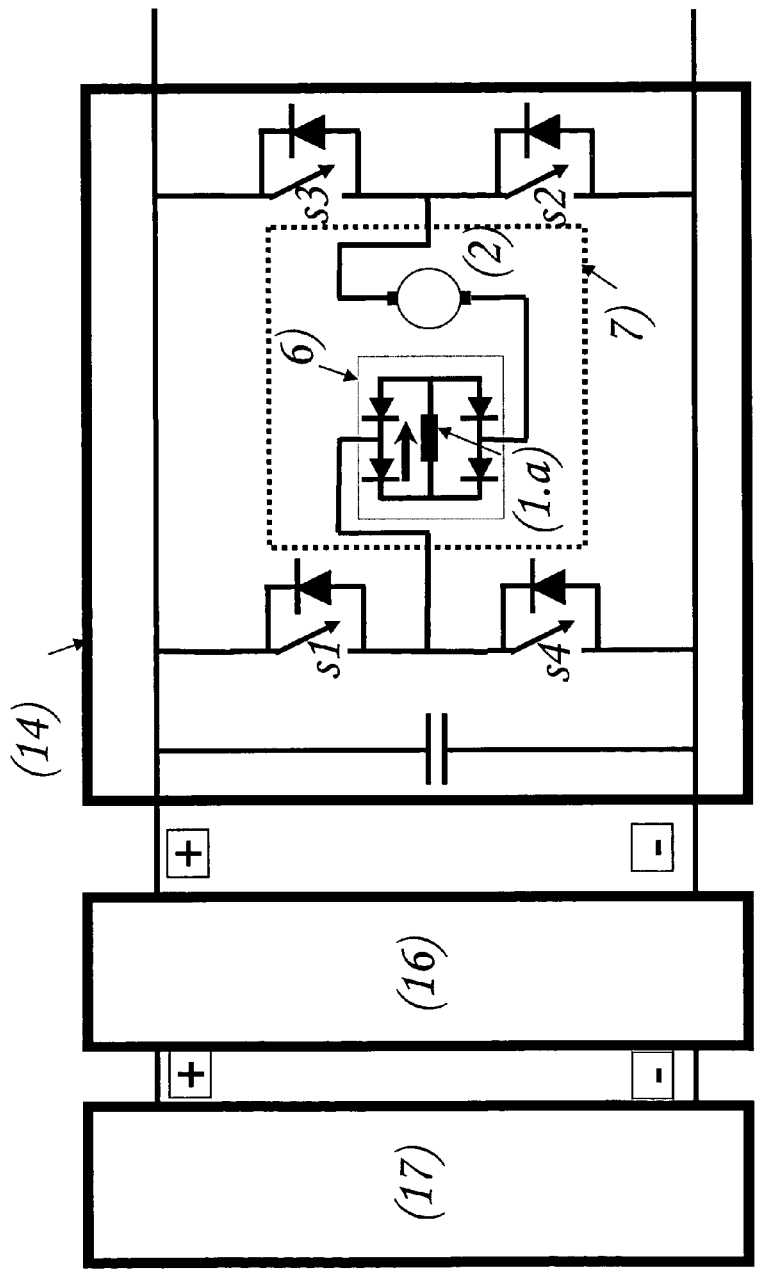
*Figure L:* DC power supply with polarity exchange (4), like a voltage commutated converter (14), regenerative, connected to DC Power Supply and internal rectifier (6). and dynamic break (16), feeding a Series Excitation DC Machine (7)

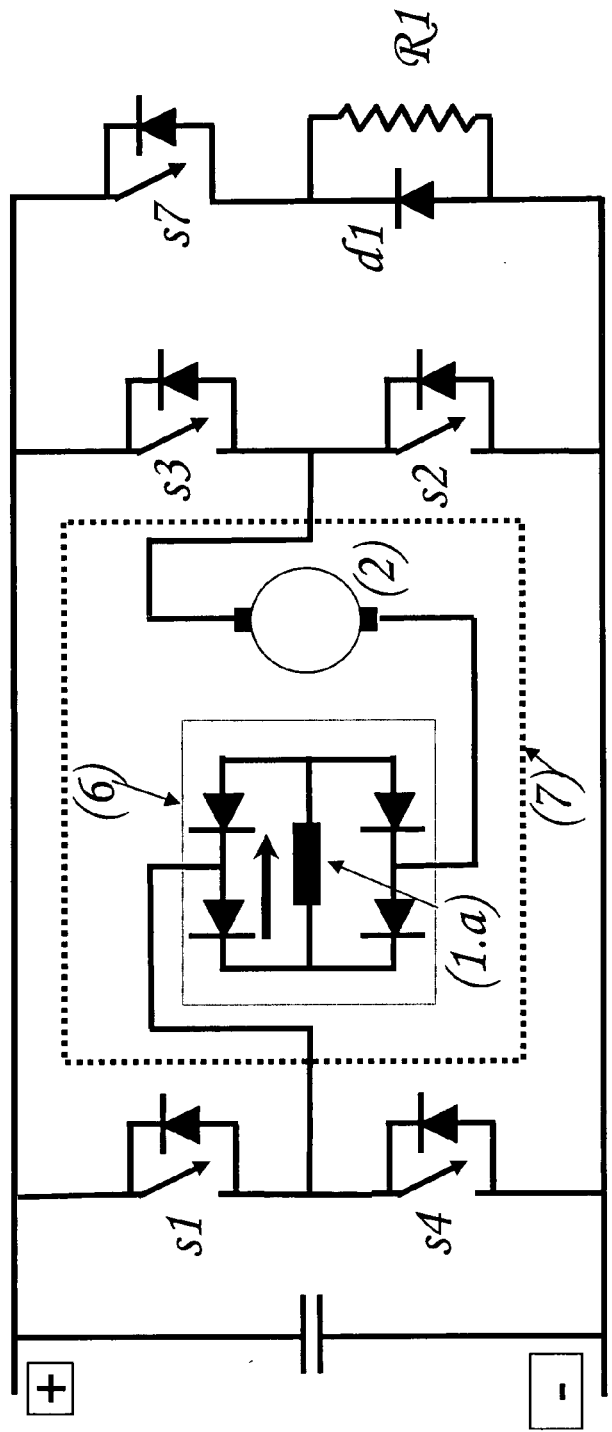
*Figure M:* *Simplified topologic diagram for Generalized four quadrant operation DC power supply with polarity exchange (4), like a voltage commutated converter (14), regenerative, connected to DC Power Supply and internal rectifier (6) and dynamic breaker (16), feeding a Series Excitation DC Machine (7)*

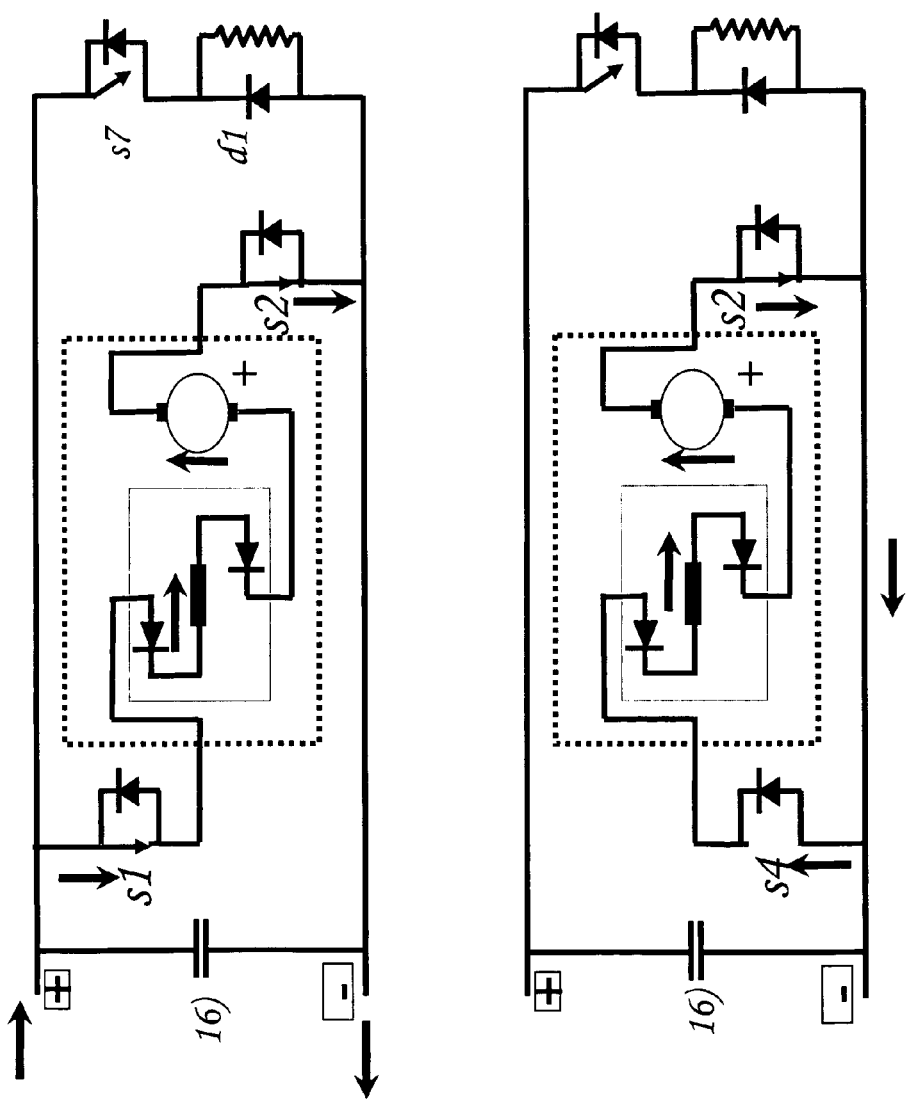
*Figure N: Operation in first quadrant like motor clockwise rotation, s1 and s2 closed, then open s1 and the current goes through free wheel diode s4, first cycle.*

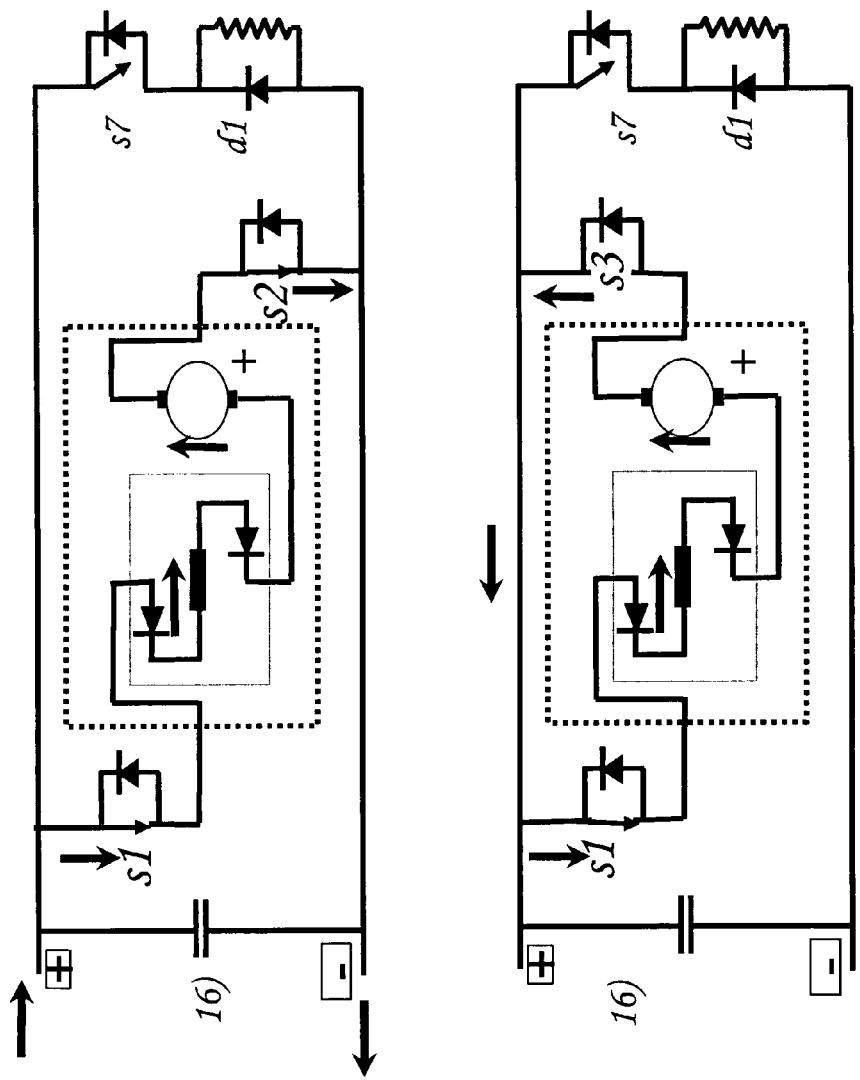
*Figure O: Operation in first quadrant like motor, clockwise rotation, s1 and s2 closed, then open s2 and the current goes through free wheel diode s3, second cycle.*

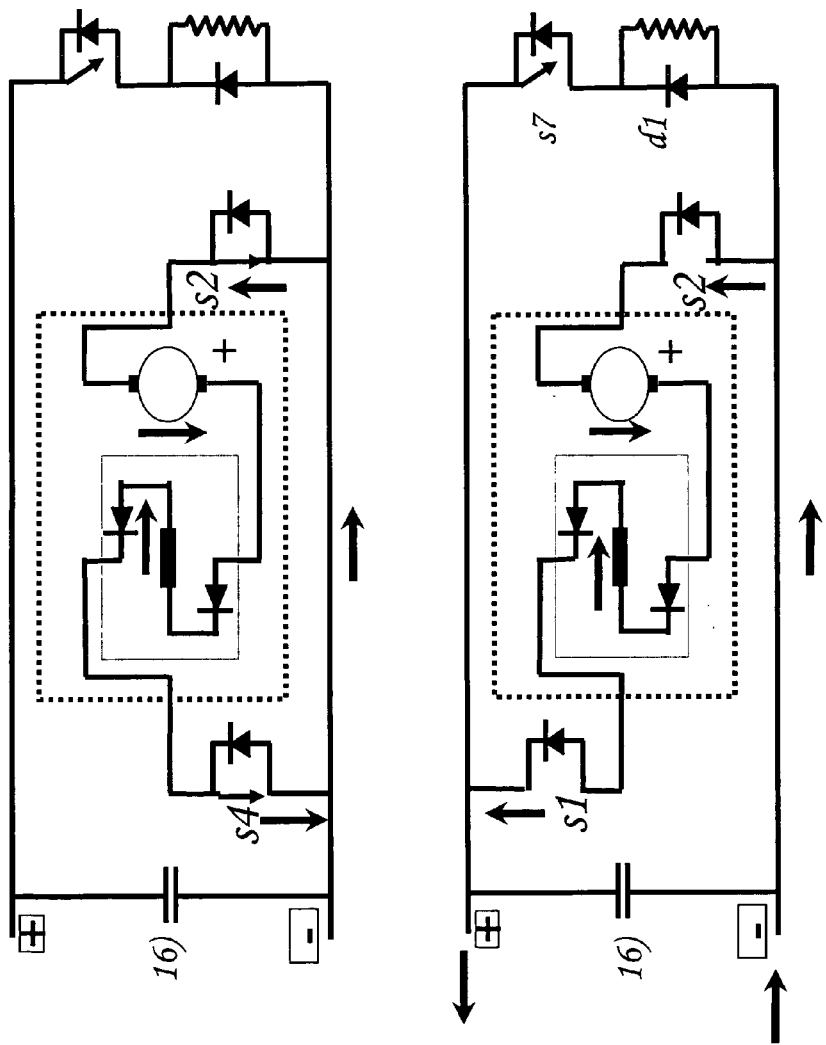
*Figure Q:* Operation in first quadrant like generator, clockwise rotation in regenerative breaking, close s4 and open s1 and s3, controlled short circuit then goes through free wheel diode s2, then open s4, and energy must be injected to the DC supply through diodes s1 and s2, first cycle.

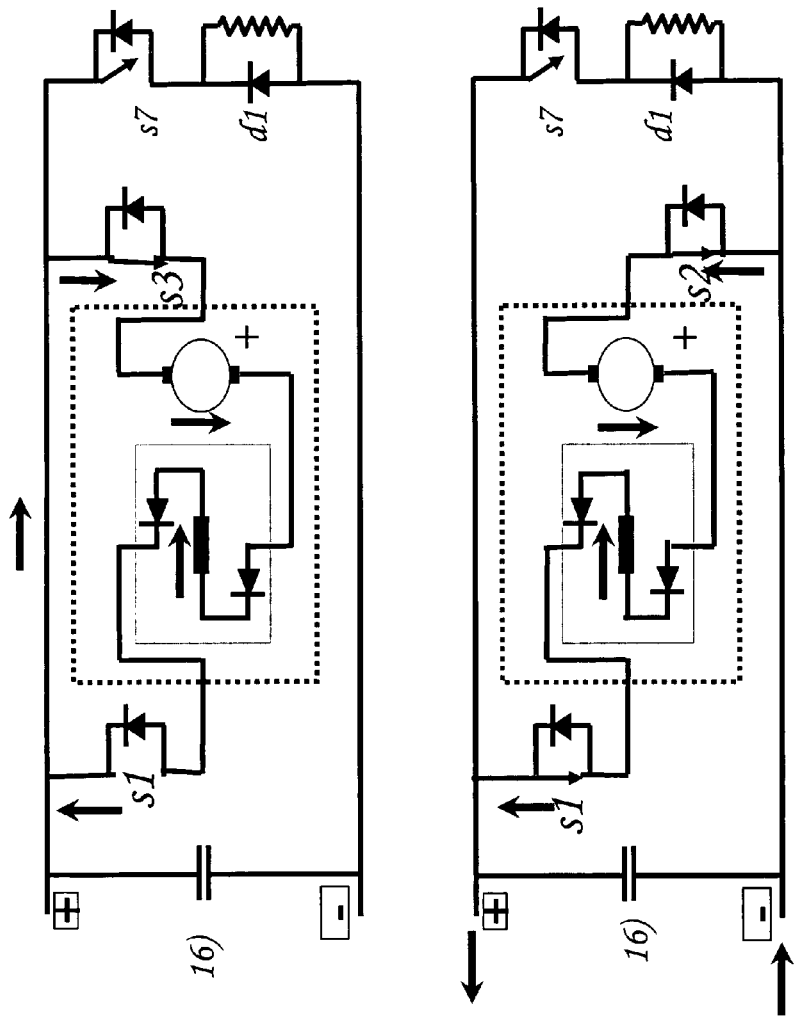
*Figure* Q: *Operation in first quadrant like generator, clockwise rotation in regenerative breaking, close s3 and open s2 and s4, controlled short circuit then goes through free wheel diode s1, then open s3, and energy must be injected to the DC supply through diodes s1 and s2, first cycle.*

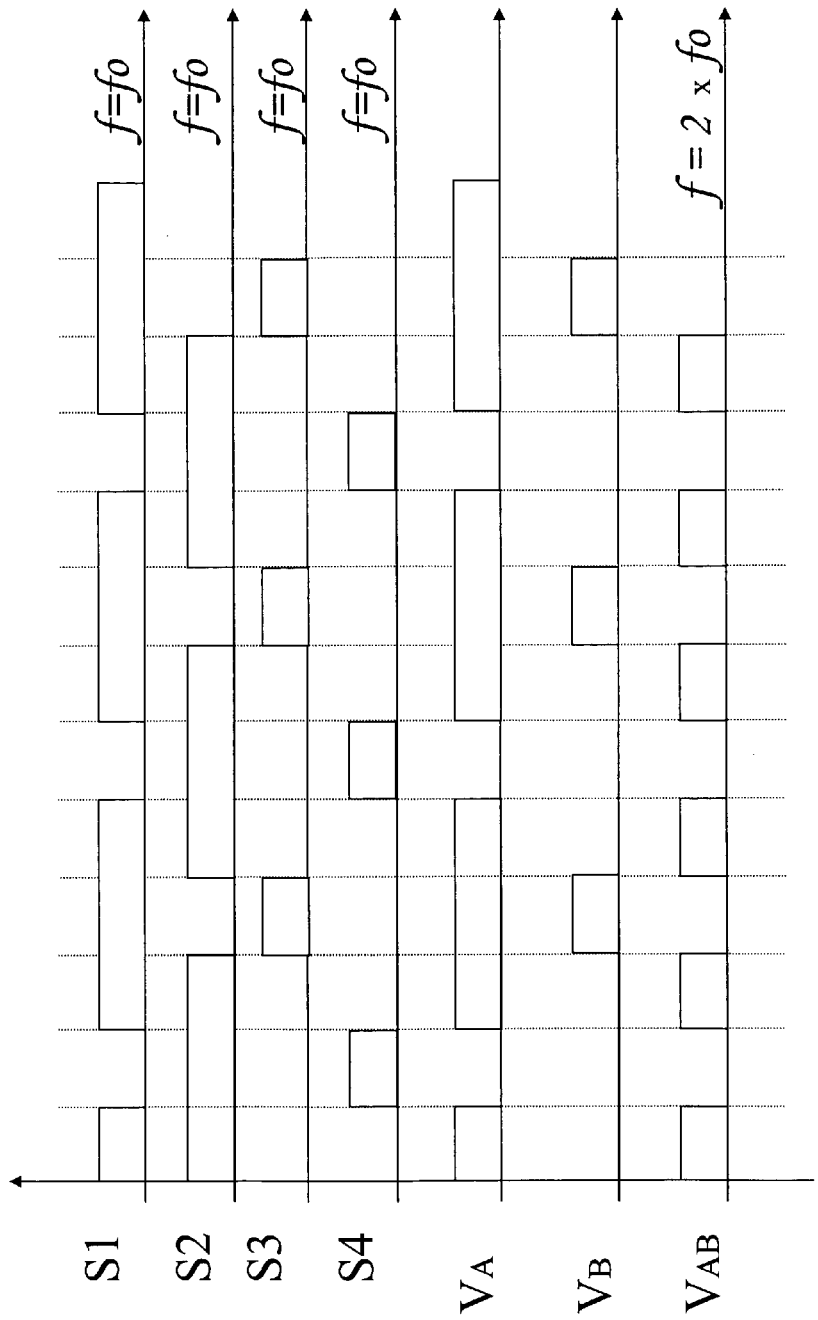
*Figure R:* Operation in first quadrant like motor clockwise rotation. For anti-clockwise rotation, the firing of the switches (S1, S4) must be interchanged by the firing of the switched (S2,S3) and vice versa.

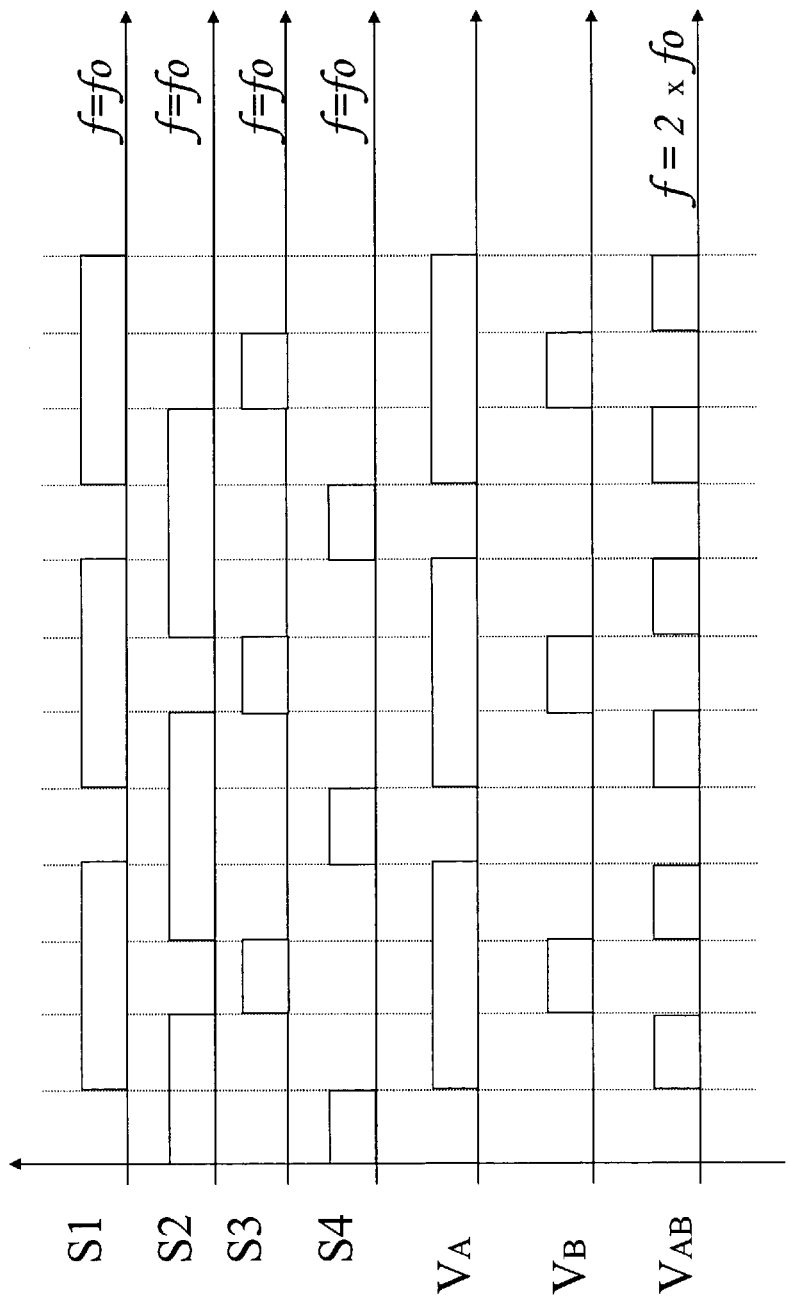
*Figure S:* Operation in first quadrant like generator (regenerative) clockwise rotation. For anti-clockwise rotation, the firing of the switches (S1, S4) must be interchanged by the firing of the switched (S2, S3) and vice versa.

GENERAL PURPOSE 100% SOLID STATE DRIVE FOR DIRECT CURRENT ROTARY MACHINES

This application claims benefit of Provisional Application No. 60/502,970 filed Sep. 16, 2003; the disclosure of which is incorporated herein by reference.

BACKGROUND OF THE INVENTION

The present application is based on Chilean Application No. 1792-03, filed on Sep. 4, 2003, the entire contents of which are incorporated herein by reference.

1. Field of the Invention

The present invention relates generally to the field of controlling all type of rotary DC machines.

The present invention is useful mainly for traction application, railways, trains, cranes, tramcars, elevators, electrical stairs, etc. but by no means is limited to such applications.

2. Discussion of the Background 2.1. Field of the Invention

The field of the invention background is to solve the maintenance problem and pour controllability of the actual dc drives mainly applied in the traction applications.

Now a day more and more dc traction system are been replaced by new AC motor with AC drives too, because these last AC technology is more efficient, more affordable, with very high reliability and controllability performance.

Before our invention was not possible to have one generalized 100% solid state, dc control who can control at the same time the mechanical and electrical variables i.e mechanical as acceleration, speed, breaking power, direction forward reverse and electrical i.e. power, current, voltage, armature and field current, and can regenerate the kinetic energy to the DC supply in breaking operation.

2.2. Discussion of the Background

The application of DC drive is loosing market in the traction industries mainly due to the low efficiency, safety and high labors maintenance that the DC control requirements.

But, migrate from the DC traction system to AC system is very expensive and surely impossible for most of the countries.

For other hands the problems of the DC traction system are mainly in the electrical control used today that use resistances and older contactors with no replaces or spare parts.

If the older DC control of DC traction motors could be replaced by electronic system with equivalent behavior of the AC system the applications of DC motor will be increased because the AC system have one more conversion, then less efficient compared with the DC.

Moreover the AC drives have the problem that must simulate with expensive electronic power circuit a DC series motors to provide high torque at low speed.

SUMMARY OF THE INVENTION

General purpose 100% solid state Direct Current drive for rotary DC machines with four quadrants operation. It is to say that allows the rotary DC machine to act like motor or generator in the two direction of possible rotation. In the first and third quadrant as motor in both direction of possible rotation, and in the second and fourth quadrant like regenerative brake DC generator, recovering the energy towards the DC network supply.

To obtain that generalized control for DC machines of any type, the invention subject of this patent, is based on the interaction of two original ideas that they are:

Maintaining the direction of the current in one and only one of the two main windings of the DC machine either field or armature, by means of a rectifier bridge.

Use a DC controlled power supply, with reversible polarity to feed the complete machine.

BRIEF DESCRIPTION OF THE DRAWING

FIG. A: Typical elementary components of a DC machine

FIG. B: DC power supply with polarity exchange (4) applied to the armature (2) through an internal rectifier (6) in series with the field winding (1.a) who maintain the current direction whatever the polarity be from (4) for controlling series excited DC machines (7).

FIG. C: DC power supply with polarity exchange (4) applied directly to the armature (2) in parallel with an internal rectifier (6) applied to the field windings (1.b) who maintain the current direction whatever the polarity be from (4) for controlling shunt DC machine (8).

FIG. D: DC power supply with polarity exchange (4) applied to the armature (2) through an internal rectifier (6) in series with the field winding (1.a) who maintain the current direction whatever the polarity be from (4) and an independent DC power supply (10) applied to part of the field windings (1.b) for controlling compound excited DC machines (9).

FIG. E: DC power supply with polarity exchange 4) without internal rectifier, for controlling separately excited DC machines (10) feed from an independent DC power supply (11).

FIG. F: Direct current power supply (12) with polarity exchange feed from external AC power supply.

FIG. E: DC power supply with polarity exchange 4) without internal rectifier, for controlling separately excited DC machines (10) feed from an independent DC power supply (11).

FIG. F: Direct current power supply (12) with polarity exchange feed from external AC power supply FIG. G: DC power supply with polarity exchange (4) connected to AC power supply using a rectifier controlled or not (13)

FIG. H: DC power supply with polarity exchange (4) connected to DC power supply, DC generator, Rectifier, battery, trolley, etc. (17).

FIG. I: DC power supply with polarity exchange (4), like a voltage commutated converter (14), regenerative, connected to DC Power Supply and internal rectifier (6).

FIG. J: DC power supply with polarity exchange (4), like a current commutated converter (15), regenerative, connected to DC Power Supply and internal rectifier (6).

FIG. K: DC power supply with polarity exchange (4), like a voltage commutated converter (14), regenerative, connected to DC Power Supply and internal rectifier (6). with over voltage limiter (16).

FIG. L: DC power supply with polarity exchange (4), like a voltage commutated converter (14), regenerative, connected to DC Power Supply and internal rectifier (6). and dynamic breaker (16), feeding a Series Excitation DC Machine (7)

FIG. M: Simplified topologic diagram for Generalized four quadrant operation DC power supply with polarity exchange (4), like a voltage commutated converter (14), regenerative, connected to DC Power Supply and internal rectifier (6) and dynamic breaker (16), feeding a Series Excitation DC Machine (7)

FIG. N: Operation in first quadrant like motor clockwise rotation, s1 and s2 closed, then open s1 and the current goes through free wheel diode s4, first cycle.

FIG. O: Operation in first quadrant like motor, clockwise rotation, s1 and s2 closed, then open s2 and the current goes through free wheel diode s3, second cycle.

FIG. P: Operation in first quadrant like generator, clockwise rotation in regenerative breaking, close s4 and open s1 and s3, controlled short circuit then goes through free wheel diode s2, then open s4, and energy must be injected to the DC supply through diodes s1 and s2, first cycle.

FIG. Q: Operation in first quadrant like generator, clockwise rotation in regenerative breaking, close s3 and open s2 and s4, controlled short circuit then goes through free wheel diode s1, then open s3, and energy must be injected to the DC supply through diodes s1 and s2, first cycle.

FIG. R: Operation in first quadrant like motor clockwise rotation. For anti-clockwise rotation, the firing of the switches (S1, S4) must be interchanged by the firing of the switched (S2, S3) and vice versa.

FIG. S: Operation in first quadrant like generator (regenerative) clockwise rotation. For anti-clockwise rotation, the firing of the switches (S1, S4) must be interchanged by the firing of the switched (S2, S3) and vice versa.

DIRECT CURRENT MACHINE OR DC MACHINE

The DC machines are equipments who use direct current to make some work. Particularly for electro mechanic energy transfer machines when a DC machines converted electrical energy from a DC supply to mechanic, then it is called "DC motor", and when the mechanical energy is converted from mechanic to electrical energy then it is called "DC generator."

The DC machines are composed for at least a field windings, an armature windings and a collector system. The field windings is put in the stator. The armature windings is put in the rotor. The collector system work commutating the current in the armature windings.

Conections of the DC Machines

There are several different connections for DC machines depending the application:

Series connection or series excitation in witch the field and armature windings are connected in series. In this case the same intensity of current flow in the armature and field windings.

Parallel connection or shunt excitation in witch the field and armature windings are connected in parallel. In this case the voltage between both windings is the same.

Independent connection or independent excitation in witch both windings are connected and fed separately.

Compound connection or compound excitation. In this case the excitation is composed for a low resistance windings section connected in series with the armature windings and high resistance windings section connected in parallel with this series group.

Control of DC Machines

The DC machines have been designed for several application and different current intensities, voltages and rotation speeds. In general to control a DC machines is enough to establish a control loop between the rotation speed and the current flowing trough the armature windings. For changing the rotation direction of a DC machine is necessary to change the direction in only one, either armature windings or field windings.

To control a DC machine, normally have been used of resistors banks, and contactors. With the development of the power electronics semiconductors like older SCR and others, the control of the DC machines every day is getting better. Meanly from the point of view of the efficiency, avoiding the resistors banks to control machine but only for some kind of motor i.e. (separate excitation). However resistors and contactors are still used in the other kind of DC motors.

Problems to Solve for Having Optimum Control of a DC Machine

The problems to solve for improving the control of a DC machine are:

Improve the efficiency of the actual control systems.

Avoid the use of mechanic contactors, relays or electro mechanic devices due to its high failure rates and also high maintenance and production costs Improve the availability of the equipment, because the use of power electronics with semiconductor require less maintenance.

Improve the control of the DC machine, mainly in operation modes such as "motor", "generator" and direction.

The Invention

The invention, object of this patent is based in the idea that current, in only one of the two DC winding type, either armature or field, the direction of the current must be maintained in all condition of operation, and using a power controller with the capability of inverting polarity.

The condition described before is the result of the use of an "internal rectifier" who maintain the direction of the current in any condition of operation mode in one of the two winding.

The above means that the invention with this characteristic is able to control all kind of DC machine like a motor or a generator, in both direction of rotation and capable to regenerate energy from mechanical to the mains.

Essential Elements or Components of the DC Drive

To obtain that generalized control for DC machines of any type, the invention subject of this patent, is based on the interaction of two original ideas that they are:

Maintaining the direction of the current in one and only one of the two main windings of the DC machine either field or armature, by means of a rectifier bridge at any condition of operation.

Use a DC controlled power supply, with reversible polarity capability to feed the complete machine.

Direct Current Machine or DC Machine

The DC machines are equipments who use direct current to make some work. Particularly for electro mechanic energy transfer machines when a DC machines converted electrical energy from a DC supply to mechanic, then it is called "DC motor", and when the mechanical energy is converted from mechanic to electrical energy then it is called "DC generator."

The DC machines are composed for at least a field windings, an armature windings and a collector system. The field windings is put in the stator. The armature windings is put in the rotor. The collector system work commutating the current in the armature windings.

Conections of the DC Machines

There are several different connections for DC machines depending the application:

Series connection or series excitation in witch the field and armature windingss are connected in series. In this case the same intensity of current flow in the armature and field windings.

Parallel connection or shunt excitation in witch the field and armature windingss are connected in parallel. In this case the voltage between both windingss is the same.

Independent connection or independent excitation in witch both windingss are connected and fed separately.

Compound connection or compound excitation. In this case the excitation is composed for a low resistance windings section connected in series with the armature windings and high resistance windings section connected in parallel with this series group.

Control of DC Machines

The DC machines have been designed for several application and different current intensities, voltages and rotation speeds. In general to control a DC machines is enough to establish a control loop between the rotation speed and the current flowing trough the armature windings. For changing the rotation direction of a DC machine is necessary to change the direction in only one, either armature windingss or field windingss.

To control a DC machine, normally have been used of resistors banks, and contactors. With the development of the power electronics semiconductors like older SCR and others, the control of the DC machines every day is getting better. Meanly from the point of view of the efficiency, avoiding the resistors banks to control machine but only for some kind of motor i.e. (separate excitation). However resistors and contactors are still used in the other kind of DC motors.

Problems to Solve for Having Optimum Control of a DC Machine

The problems to solve for improving the control of a DC machine are:

Improve the efficiency of the actual control systems.

Avoid the use of mechanic contactors, relays or electro mechanic devices due to its high failure rates and also high maintenance and production costs Improve the availability of the equipment, because the use of power electronics with semiconductor require less maintenance.

Improve the control of the DC machine, mainly in operation modes such as "motor", "generator" and direction.

The Invention

The invention, object of this patent is based in the idea that current, in only one of the two DC winding type, either armature or field, the direction of the current must be maintained in all condition of operation, and using a power controller with the capability of inverting polarity.

The condition described before is the result of the use of an "internal rectifier" who maintain the direction of the current in any condition of operation mode in one of the two winding.

The above means that the invention with this characteristic is able to control all kind of DC machine like a motor or a generator, in both direction of rotation and capable to regenerate energy from mechanical to the mains.

Elements or Components of the Drive

The drive is composed by the interaction of the two following functional elements:

A current controller with polarity inversion capability.

A system which maintain the direction of the current in one of the two winding either armature or field at any conditions of operations.

The invention claimed is:

1. An apparatus comprising,
(a) a solid state drive comprising a direct current (DC) machine, said DC machine comprising a DC power supply with reversible polarity:
(b) said DC machine comprising a field winding and an internal bridge rectifier, said internal bridge rectifier comprising input terminals and comprising positive and negative output terminals, and wherein said field winding is connected between said positive and negative output terminals of said internal bridge rectifier;
(c) said DC machine comprising an armature winding, said armature winding being connected in series with said input terminals of said internal bridge rectifier;
(d) wherein said armature winding is connected in parallel with said input terminals of said internal rectifier.

2. An apparatus comprising,
(a) a solid state drive comprising a direct current (DC) machine, said DC machine comprising a DC power supply with reversible polarity;
(b) said DC machine comprising a field winding and an internal bridge rectifier, said internal bridge rectifier comprising input terminals and comprising positive and negative output terminals, and wherein said field winding is connected between said positive and negative output terminals of said internal bridge rectifier;
(c) said DC machine comprising an armature winding, said armature winding being connected in series with said input terminals of said internal bridge rectifier;
(d) wherein said armature winding is connected as in a compound DC excitation machine.

3. An apparatus as claimed in claim 1, wherein said input terminals of said internal rectifier are connected to an independent source as in a separate DC excitation machine.

4. An apparatus as claimed in claim 1, wherein said power supply corresponds to a voltage commutated converter fed from a DC line.

5. An apparatus as claimed in claim 1, wherein said power supply corresponds to a current commutated converter fed from a DC line.

6. An apparatus as claimed in claim 1, wherein said power supply corresponds to a couple of controlled rectifiers connected in antiparallel and fed from an AC line.

7. An apparatus as claimed in claim 1, wherein said field winding is interchanged by said armature winding and vice versa.

8. An apparatus as claimed in claim 1, wherein said power supply with reversible polarity is fed from: (a) a DC generator; (b) an AC generator (plus a rectifier); (c) a DC battery; (d) a DC catenary; or (e) an AC (plus a rectifier) catenary.

9. An apparatus as claimed in claim 1, wherein said power supply with reversible polarity has an over voltage limiter (over voltage protection).

10. An apparatus as claimed in claim 2, wherein said power supply corresponds to a voltage commutated converter fed from a DC line.

11. An apparatus as claimed in claim 2, wherein said power supply corresponds to a current commutated converter fed from a DC line.

12. An apparatus as claimed in claim 2, wherein said power supply corresponds to a couple of controlled rectifiers connected in antiparallel and fed from an AC line.

13. An apparatus as claimed in claim 2, wherein said field winding is interchanged by said armature winding and vice versa.

14. An apparatus as claimed in claim 2, wherein said power supply with reversible polarity is fed from: (a) a DC generator; (b) an AC generator (plus a rectifier); (c) a DC battery; (d) a DC catenary; or (e) an AC (plus a rectifier) catenary.

15. An apparatus as claimed in claim 2, wherein said power supply with reversible polarity has an over voltage limiter (over voltage protection).

16. An apparatus as claimed in claim 3, wherein said power supply corresponds to a voltage commutated converter fed from a DC line.

17. An apparatus as claimed in claim 3, wherein said power supply corresponds to a current commutated converter fed from a DC line.

18. An apparatus as claimed in claim 3, wherein said power supply corresponds to a couple of controlled rectifiers connected in antiparallel and fed from an AC line.

19. An apparatus as claimed in claim 3, wherein said field winding is interchanged by said armature winding and vice versa.

20. An apparatus as claimed in claim 3, wherein said power supply with reversible polarity is fed from: (a) a DC generator (b) an AC generator (plus a rectifier); (c) a DC battery; (d) a DC catenary; or (e) an AC (plus a rectifier) catenary.

21. An apparatus as claimed in claim 3, wherein said power supply with reversible polarity has an over voltage limiter (over voltage protection).

* * * * *